Oct. 28, 1941.  J. Y. HUBER, JR., ET AL  2,261,062
MACHINE FOR SEPARATING FRANGIBLE SHEET MATERIAL
Filed April 5, 1939  5 Sheets-Sheet 1

Oct. 28, 1941. J. Y. HUBER, JR., ET AL 2,261,062
MACHINE FOR SEPARATING FRANGIBLE SHEET MATERIAL
Filed April 5, 1939 5 Sheets-Sheet 2

Inventors:
John Y. Huber Jr.
John Clark Baxter
by their Attorney
Howson & Howson Oct. 28, 1941.  J. Y. HUBER, JR., ET AL  2,261,062
MACHINE FOR SEPARATING FRANGIBLE SHEET MATERIAL
Filed April 5, 1939  5 Sheets-Sheet 3
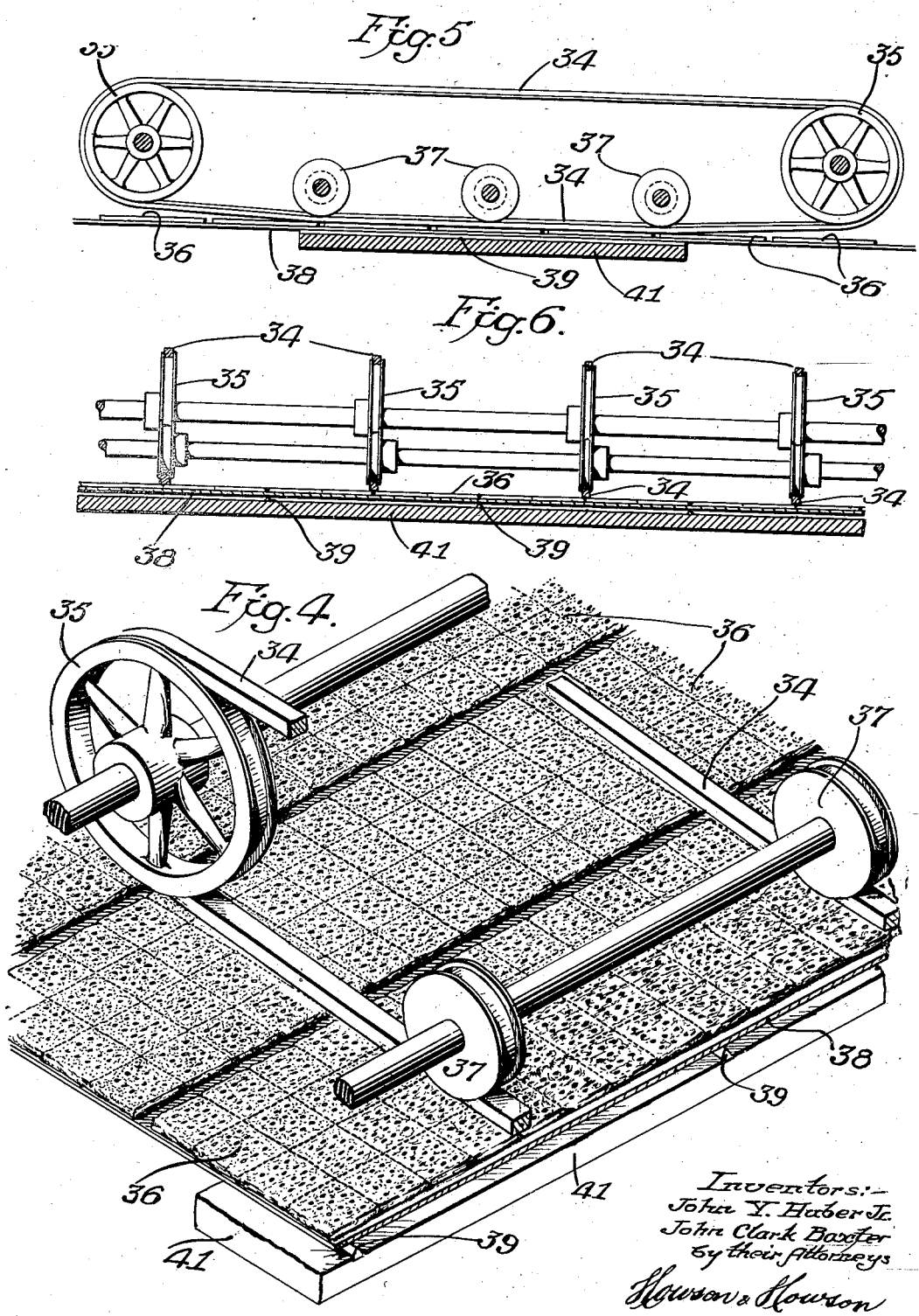

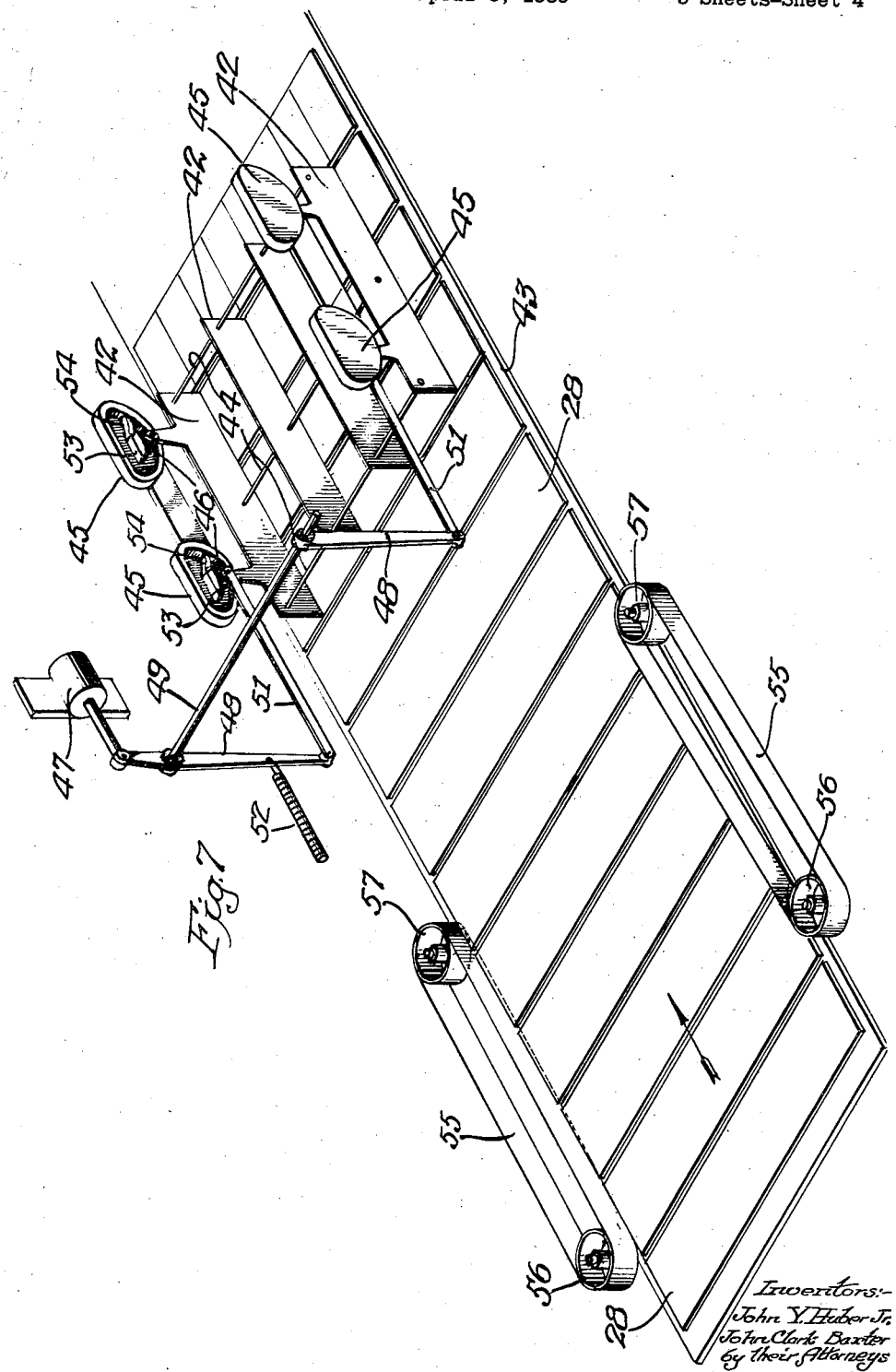

Oct. 28, 1941.   J. Y. HUBER, JR., ET AL   2,261,062
MACHINE FOR SEPARATING FRANGIBLE SHEET MATERIAL
Filed April 5, 1939   5 Sheets-Sheet 5
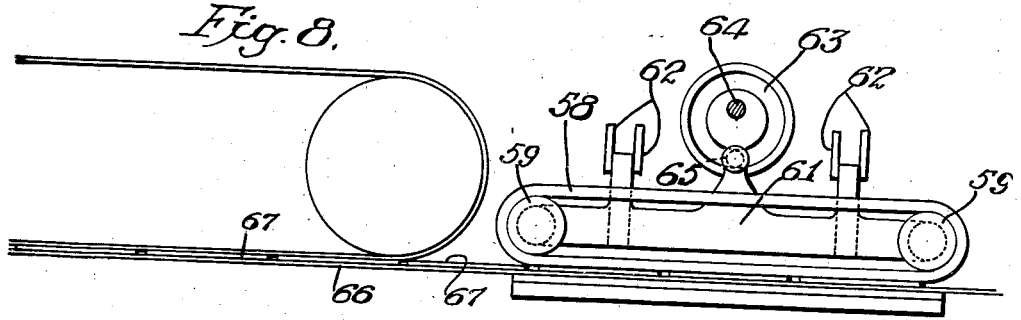
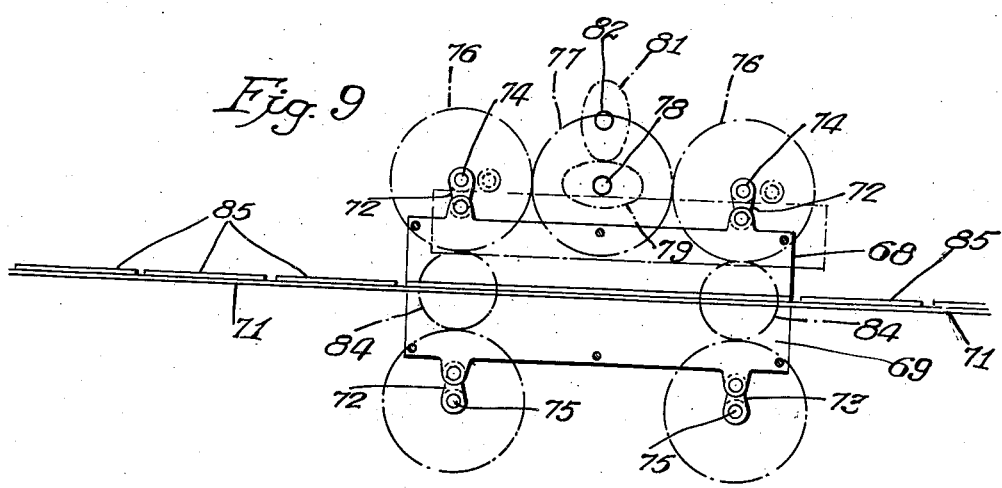
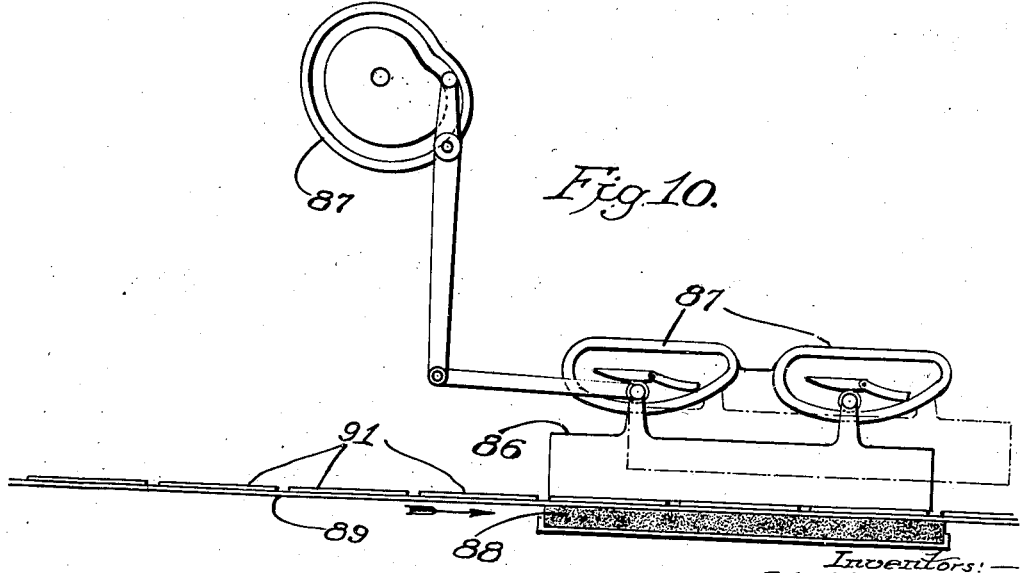
Inventors:—
John Y. Huber Jr
John Clark Baxter
by their Attorneys
Howson & Howson Patented Oct. 28, 1941

2,261,062

UNITED STATES PATENT OFFICE 2,261,062

MACHINE FOR SEPARATING FRANGIBLE SHEET MATERIAL

John Y. Huber, Jr., Haverford, and John Clark Baxter, Philadelphia, Pa., assignors to United Biscuit Company of America, Chicago, Ill., a corporation of Delaware Application April 5, 1939, Serial No. 266,224

2 Claims. (Cl. 146—129)

In the production of certain types of commercial cracker, relatively large sheets of dough are baked and subsequently divided into a plurality of sections of size suitable for packaging. It is the conventional practice to separate the sheets into the individual sections by hand, and to facilitate this operation, the sheets prior to baking are scored so as to provide lines of lesser strength on which the said sections may be readily separated. This operation necessarily involves a substantial expenditure of time and considerable handling of the crackers, both of which are undesirable.

The principal object of the present invention is to provide mechanical means for breaking up the baked sheets into sections of any predetermined size and shape suitable for packaging.

Another object of the invention is to provide a machine of the stated type which shall be capable of operating continuously to break up the said sheets fed in succession to the machine, and of delivering the sections after separation for packaging.

Another object is to provide a machine of the stated type that shall be readily adjustable to accommodate crackers of different size.

The invention further resides in certain structural details and mechanical devices hereinafter described and illustrated in the attached drawings, wherein:

Fig. 4 is a fragmentary view in perspective illustrating a modification within the scope of our invention;

Fig. 5 is a diagrammatic longitudinal sectional view of the modified form of apparatus shown in Fig. 4;

Fig. 6 is a transverse sectional view on the line 6—6, Fig. 5;

Fig. 7 is a diagrammatic view in perspective illustrating still another modification of the device, and Figs. 8, 9 and 10 are diagrammatic side elevational views illustrating still further modifications within the scope of the invention.

Figure 1:
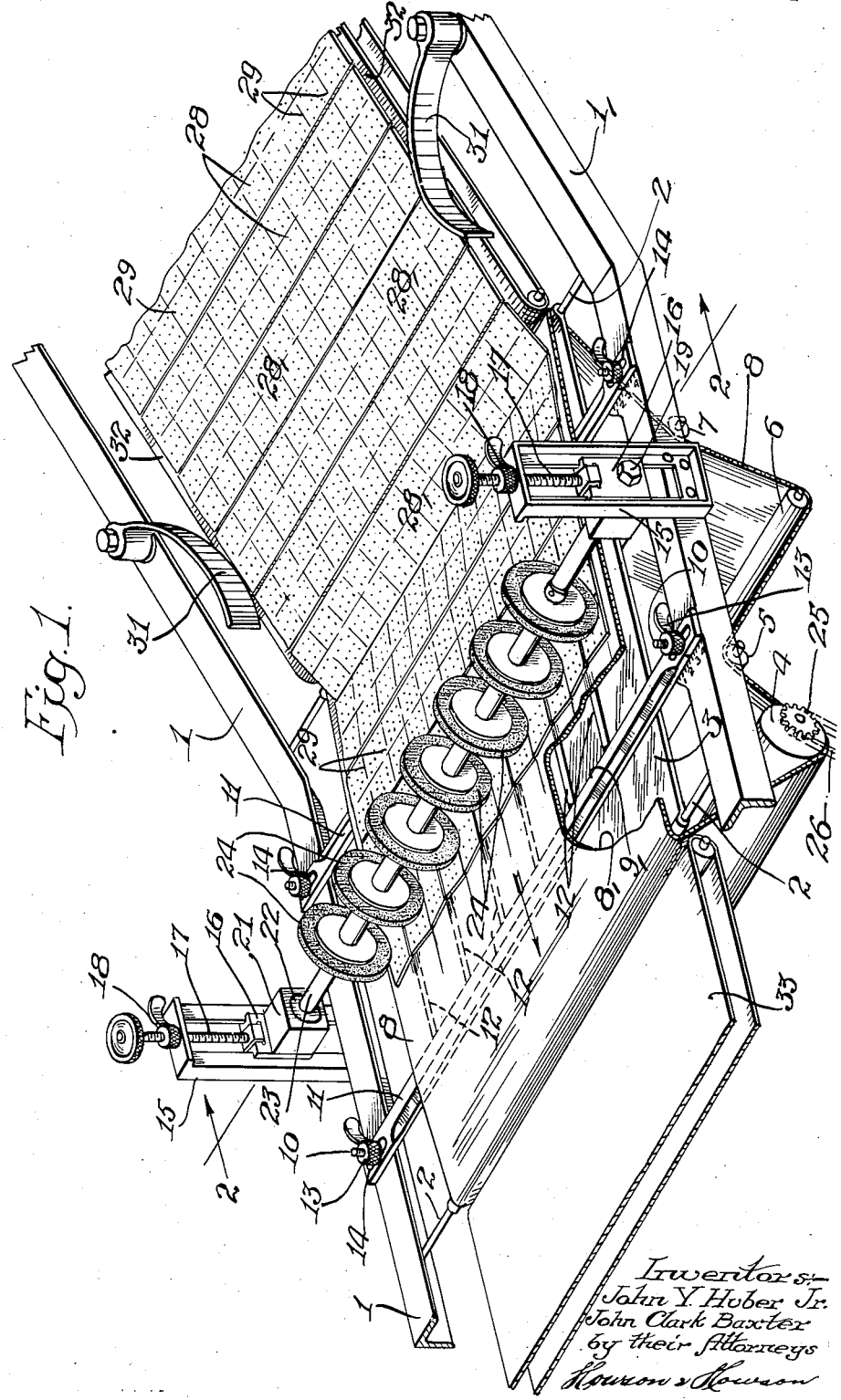
Figure 1 is a view in perspective of a machine made in accordance with our invention.
Figure 2:
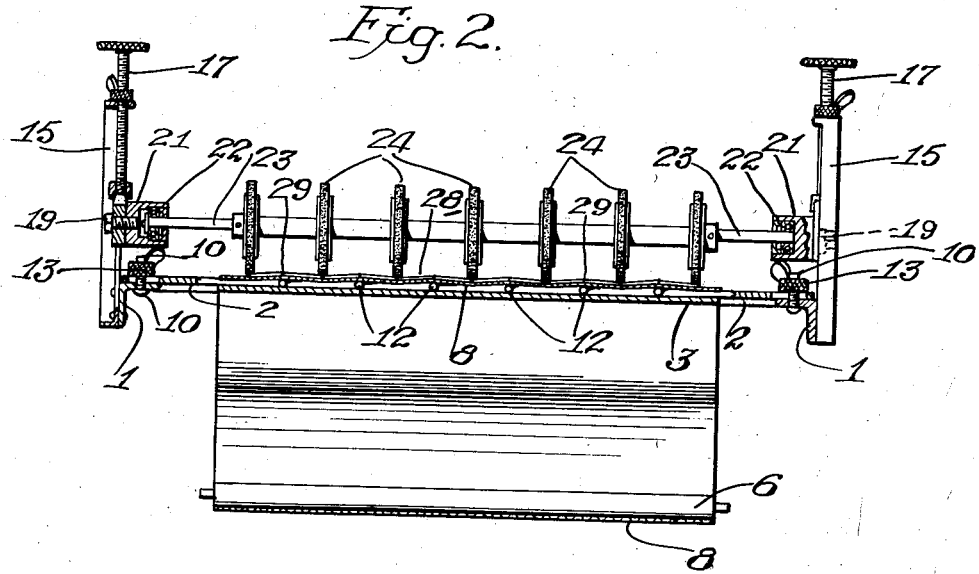
Fig. 2 is a transverse sectional view on the line 2—2, Fig. 1.
Figure 3:
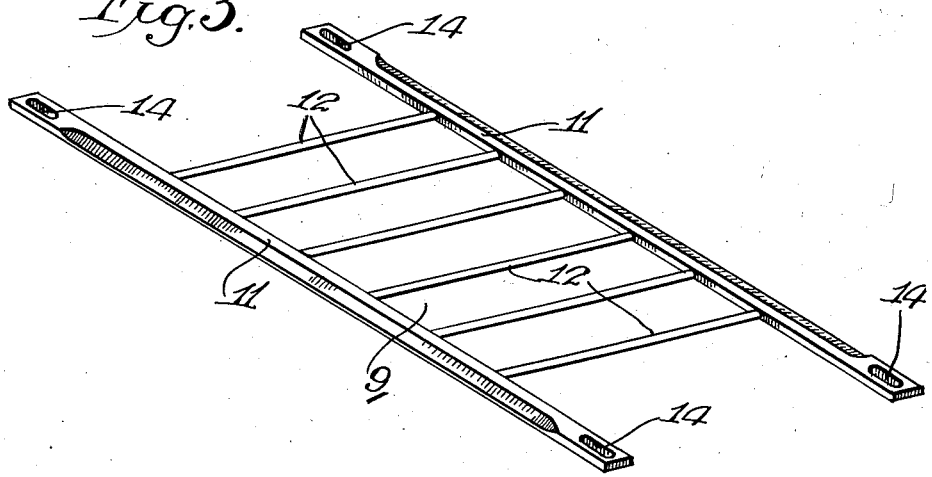
Fig. 3 is a view in perspective of one of the elements of the device shown in Fig. 1.

With reference to the embodiment of our invention shown in Fig. 1, the fixed frame of the machine is represented in the present instance by two parallel angle bars 1, 1. Suitably supported in this frame upon transverse bars 2 is a bed plate 3. Below the bed plate and also suitably mounted in the fixed frame of the machine are a series of rollers designated by the reference numerals 4, 5, 6 and 7, and a flexible endless belt 8 passes over these rollers and over the bed plate 3. Interposed between the upper surface of the bed plate and the belt 8 is an open frame-like structure 9, see Fig. 3, this structure comprising two parallel end members 11, 11 which, as shown in Figs. 1 and 2, are supported at their extremities upon the members 1, 1 of the frame, said structure 9 also comprising a plurality of parallel spaced cross rods 12, which in the assembly extend in the direction of movement of the belt 8 and which constitute a support for the latter. It will be noted that the ends of the members 11 are secured to the frame elements 1, 1 by studs 10 and wing nuts 13, and that the members 11 are slotted longitudinally at their ends, as indicated at 14, for reception of the said studs whereby the structure 9 may be adjusted on the frame 1 transversely of the belt 8.

Secured to each of the frame members 1 is an upstanding bracket 15, and slidably mounted for vertical adjustment in each of these brackets is a block 16. A screw 17 is threaded downwardly through the top of each of the brackets 15, and is rotatably secured at its lower end to the top of the block 16, the screws thereby functioning as a means for vertically adjusting the blocks in the brackets and for retaining them in the adjusted position. A lock nut 18 is provided for each of the screws for maintaining the latter fixed in the adjusted position.

Detachably secured by means of a screw 19 to each of the slides 16 is an open-ended journal box 21, and each of these boxes is adapted to receive an anti-friction bearing 22, these bearings supporting the respective ends of a shaft 23. Carried by the shaft 23 are a plurality of rubber or other suitable disk wheels 24 which function cooperatively with the member 9 and the belt 8 to separate the cracker sheets into relatively small sections, as hereinafter described. It will be noted that by removal of the screws 19 the entire shaft assembly, including the shaft itself and the associated journal boxes 21, may be lifted from the machine.

The belt 8 is driven in the direction of the arrow, Fig. 1, by means, in the present instance, of the roller 4, which carries at one end a sprocket 25, this sprocket being connected by a chain 26 to a suitable source of power. The shaft 23 is adjusted vertically with respect to the belt 8 so that when a strip or sheet of crackers is passed under the wheels a slight depression of the said sheet occurs accompanied by a corresponding slight depression of the belt. The member 9 is so arranged that the cross rods 12 lie respectively between the adjacent pairs of the disks 24, so that as the disks create pressure upon the cracker sheet and through this sheet upon the belt 8, the latter is pressed downwardly between each of the adjoining pairs of cross rods 12, as best shown in Figs. 1 and 2. The cracker sheets are indicated in Fig. 1 by the reference numeral 28, and it will be noted that the number and relative arrangement of the cross rods 12 of the member 9 is such that the said cross rods may underlie every alternate line of the scorings 29, said scorings being preformed, as previously described, in the baked sheet. Similarly the number and relative arrangement of the disks 24 is such that, in addition to the two edges of the sheets, the said disks respectively engage the sheets 28 upon the remaining lines of the scorings 29 which overlie the spaces between the cross bars 12. As the sheet of crackers passes under the disks 24, therefore, the sheet is bent sharply at each of the scored lines 29 to an extent causing fracture of the sheet along these lines of lesser strength, whereby the sheet is divided into a number of relatively small sections of uniform size.

It is apparent that in a device of this character means must be provided not only for accurately setting the member 9 with respect to the disks 24, but also for accurately aligning the sheets of crackers 28 on the belt 8 so that the scored lines 29 will register accurately with the cross bars 12 of the member 9 and with the disks 24 of the shaft 23. Accurate location of the cross rods 12 with respect to the disks 24 is effected by adjustment of the member 9 transversely of the frame 1 through the medium of the slots 14 previously described. Accurate placement of the sheets 28 upon the belt with respect to said rods and disks is effected in the present instance by means of a pair of resilient fingers 31, 31 which are adjustably secured to the frame members 1, 1, respectively, and which extend inwardly to present their convex faces to the edges of the sheets 28 as the latter are fed to the belt 8 upon an inclined delivery belt 32, this latter belt being operated in synchronism with the belt 8. From the belt 8 the separated sections of the divided sheets pass to a conveyer belt 33 which carries the crackers to the packaging station where the said sections are removed and placed in the boxes or packages in which they are merchandised.

It is to be noted that the operation as described above is a continuous one, the sheets of crackers 28 being fed consecutively to the belt 8, and being carried by this belt in a continuous movement underneath the disks 24. By use of the disks 24 mounted on a freely rotatable shaft, undesirable friction between these disks and the crackers is eliminated, the disks rotating by engagement with the forwardly advancing cracker sheets. It will be noted further that the device is readily adjustable to crackers of different size, it being only necessary to replace the member 9 and the shaft and disk assembly 23—24 by others conforming to the particular size of the individual section desired.

In Figs. 4, 5 and 6, we have illustrated another embodiment of our invention wherein the disks 24 are replaced by a series of endless belts 34. Each of these belts operates upon a set of pulleys 35, 35, and the lower run of each of the belts is guided into contact with the cracker sheets, designated in this instance by the reference numeral 36, by means of idler or guide pulleys 37. The sheets 36 are advanced under the belts 34 on a conveyer 38 corresponding to the conveyer 8 of the previously described embodiment, and between each transversely adjoining pair of the pulleys 37 the conveyer 38 is supported upon a rod 39, these rods corresponding to the rods 12 of the embodiment previously described. A suitable bed plate 41 is provided, also as in the previous embodiment. In this instance, however, it is desirable to drive the belts 34 by positive means in exact synchronism with the movement of the belt 38 to thereby avoid undesirable friction between the belts and the cracker sheets 36. It will be apparent that the principle of operation is the same as that previously described, but that in this case the use of the belts 34 provides a considerably greater length of contact with the cracker sheets 36 than do the disks 24 of the other embodiment. The embodiment illustrated in Figs. 4, 5 and 6, therefore, is well suited to operation upon relatively large sheets of crackers or sheets of relatively great width in the direction of their movement with the conveyer 38.

The embodiment of the invention shown in Fig. 7 operates on essentially the same principle as that of the embodiments previously described. In this instance, however, instead of the disks 24 or the belts 34 of the previously described embodiments, we employ a set of rigid blades 42 which are mounted for oscillation above the belt 43. The blades 42, which are bound rigidly together in their parallel spaced relation by rods 44, move in a curved path controlled by a set of relatively fixed cams 45. The two end blades of the assembly carry rollers 46, 46 which travel in the cams and from which the blade assembly depends.

The movement of the blade assembly is effected through a solenoid 47, which is connected to the blade assembly through the medium of levers 48, 48 secured to a rock shaft 49, the lower ends of these levers being connected to the blade assembly by links 51, 51. A spring 52 secured to one of the levers 48 exerts continuous tension to draw the blade assembly toward the left, as viewed in Fig. 7, and the solenoid 47 is intermittently energized to move the assembly in the opposite direction against the tension of the spring 52. When the solenoid 47 is energized, the rollers 46 move to the right, as viewed in Fig. 7, along the lower rim of the cam, being held down in this movement by fixed guide elements 53 within the cams. To the ends of the elements 53 are pivotally secured latch-like extensions 54 which permit the rollers to travel upwardly at the far end of the cam, and which as the rollers approach the upper part of the cam rim drop downwardly into place, as shown in Fig. 7, to thereby direct the roller over the top of the fixed guides 53 to the near end of the cam, movement in this direction being effected by the spring 52. At the near end of the cam, the rollers pass off of the guides 53 to again move in the opposite direction along the lower rim of the cam under the action of the solenoid 47.

As the rollers travel along the lower portions of the cam, the blades 42 move downwardly into engagement with the sheets of crackers, as previously described, to depress the sheets at the localized points, thereby effecting parting of the sheet along the scored lines. This travel of the blades is in the direction of movement of the conveyer, and the movements are synchronized so that the action of the blades on the crackers is that of simple downward pressure. On the reverse or return movement of the blades, the latter are elevated by the cams above the sheets of crackers traveling on the belt. Except for the character of the pressure means, this embodiment of our invention operates on the same essential principle as that set forth in the other embodiments. It will be noted, however, that, in Fig. 7, the device for aligning the sheets 28 of crackers differs from that shown in Fig. 1. The aligning means in this instance consists of two endless belts 55, 55 arranged at opposite sides of the belt 43 for engagement with the ends of the sheets or strips 28, the rollers 56, 56 which support the belts at one end being somewhat further apart than the rollers 57, 57 at the opposite ends.

In the embodiment shown in Fig. 8, the pressure device differs somewhat from those employed in the previously described embodiments. In this instance, the individual pressure elements consist of endless belts 58 which are mounted on suitable wheels 59, 59 in a frame 61. This frame is guided for vertical reciprocation in ways 62, and the vertical reciprocation of the frame is effected through the medium of eccentric cams 63 carried by transverse shafts 64, said frame having rollers 65 which engage in the cam groove as illustrated. Means, such for example as a flexible shaft (not shown) connected to one of belt-supporting rollers of each set, is provided in this case for actuating the belts 58 so that their lower runs travel in the same direction and at the same rate of speed as the belts 66 which carry the sheets of crackers 67. At each downward movement of the frame 61 one or more of the cracker sheets is subjected to the slight pressure required to break up the sheets into the desired sections.

In Fig. 9, we have shown the pressure means consisting of two sets of rigid blades 68 and 69 arranged respectively at the top and bottom of the carrier belt 71, the blades 68 being in staggered relation with the blades 69. Both of the blade assemblies, 68 and 69, are mounted in this case upon cranks 72, 72 and 73, 73 which are secured to relatively fixed shafts 74, 74 and 75, 75. Each of the shafts 74 is provided with a gear 76 which mesh with an intermediate gear 77, these three gears being of uniform size. The gear 77 is mounted on a shaft 78, and this shaft carries an elliptical gear 79 which meshes with a corresponding elliptical gear 81 on a drive shaft 82. Each of the gears 76 is connected to a corresponding gear 83, on the shafts 75, 75 respectively, through the medium of an idler gear 84. Through this mechanism the blade assemblies are oscillated, as indicated in the drawings, so as to move in synchronism with the movement of the belt 71 and to exert the required pressure on the under side of the belt and on the tops of the cracker sheets 85 to produce the desired localized bending of the latter.

The embodiment illustrated in Fig. 10 corresponds substantially to that shown in Fig. 7, which has been previously described. In this instance, the blade assembly 86 is actuated by a cam or cams 87. This embodiment of our invention departs also from those previously described, in that the function of the rods 12 or 39 is filled by a flexible sponge rubber or other suitable pad 88 which underlies the carrier belt 89 immediately below the position of the blade assembly 86. Pressure of the blades 86 upon the cracker sheets 91 is transferred through the belt to the underlying rubber pad 88, this pad being locally depressed in the portions immediately under the individual blades, and the intervening portions of the pad remaining undepressed. In this manner, the slight localized distortion of the cracker sheets which is required to break the frangible sheets into the individual sections along the scored lines is obtained in substantially the same manner, but by other means, as in the previously described embodiments.

We claim:

1. In a machine for separating frangible sheet material into a plurality of sections on preestablished lines of lesser strength, the combination with a conveyer for said sheets and means for continuously moving said conveyer, of means for feeding said sheets successively to the conveyer, means operatively associated with said conveyer for flexing said sheets along said lines of lesser strength to an extent effecting a fracture of said sheets on said lines, said flexing means comprising a plurality of belts arranged in spaced parallel relation above the conveyer and extending longitudinally of the latter and arranged to apply pressure to the said sheets along alternate ones of said lines of lesser strength, said belts being narrow so as to contact the sheet only within the immediate areas of the respective said lines, means at the under side of the conveyer for supporting the sheet along the others of said lines of lesser strength, and means for driving said belts so that the parts thereof engaging the said sheet shall move in the same direction and at the same speed as said conveyer.

2. In a machine for separating frangible sheet material into a plurality of sections on preestablished lines of lesser strength, the combination with a conveyer for said sheets and means for continuously moving said conveyer, of means for feeding said sheets successively to the conveyer, means operatively associated with said conveyer for flexing said sheets along said lines of lesser strength to an extent effecting a fracture of said sheets on said lines, said flexing means comprising a plurality of blades mounted in spaced parallel relation above the conveyer and extending longitudinally of the latter and arranged to engage the said sheet on alternate ones of said lines of lesser strength, each of said blades having a firm narrow working edge not materially exceeding in width the said line of lesser strength, means at the under side of said conveyer for supporting the sheets on the others of said lines of lesser strength, and means for actuating said blades to bring the latter intermittently into operative position with respect to said sheets.

JOHN Y. HUBER, Jr.
JOHN CLARK BAXTER.